US012119571B2

(12) United States Patent
Tsuchiya

(10) Patent No.: US 12,119,571 B2
(45) Date of Patent: Oct. 15, 2024

(54) ANTENNA DEVICE

(71) Applicant: NEC Platforms, Ltd., Kawasaki (JP)

(72) Inventor: Masato Tsuchiya, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 126 days.

(21) Appl. No.: 17/908,319

(22) PCT Filed: Mar. 22, 2021

(86) PCT No.: PCT/JP2021/011658
§ 371 (c)(1),
(2) Date: Aug. 31, 2022

(87) PCT Pub. No.: WO2021/193506
PCT Pub. Date: Sep. 30, 2021

(65) Prior Publication Data

US 2023/0101103 A1 Mar. 30, 2023

(30) Foreign Application Priority Data

Mar. 27, 2020 (JP) ................................ 2020-057192

(51) Int. Cl.
*H01Q 9/16* (2006.01)
*H01Q 9/26* (2006.01)
(Continued)

(52) U.S. Cl.
CPC ............... *H01Q 9/28* (2013.01); *H01Q 19/06* (2013.01)

(58) Field of Classification Search
CPC .......... H01Q 19/06; H01Q 5/37; H01Q 5/378; H01Q 9/16; H01Q 9/26; H01Q 9/28; H01Q 9/285
See application file for complete search history.

(56) References Cited

U.S. PATENT DOCUMENTS 4,668,956 A * 5/1987 Mahnad ................. H01Q 13/18 343/789
4,812,855 A * 3/1989 Coe ........................ H01Q 19/30 343/815

(Continued)

FOREIGN PATENT DOCUMENTS

JP 2003-110329 A 4/2003
JP 2003-243916 A 8/2003

(Continued)

OTHER PUBLICATIONS

International Search Report for PCT Application No., PCT/JP2021/011658, malled on Jun. 1, 2021.

(Continued)

*Primary Examiner* — Tho G Phan

(57) ABSTRACT

An antenna device includes: a mounting board including a circuit configured to process a radio signal; a dipole antenna element configured to receive the radio signal, the dipole antenna element being disposed in the mounting board; and a parasitic element including a first conductor wire parallel to the dipole antenna element, a second conductor wire connected to the first conductor wire at a first end of the first conductor wire at an angle larger than 0 degrees and smaller than 180 degrees, and a third conductor wire connected to the first conductor wire at a second end of the first conductor wire at an angle larger than 0 degrees and smaller than 180 degrees, in which at least an end of the second conductor wire is located near the dipole antenna element.

3 Claims, 10 Drawing Sheets

(51) Int. Cl.

| | |
|---|---|
| ***H01Q 9/28*** | (2006.01) |
| ***H01Q 19/06*** | (2006.01) |

(56) References Cited

U.S. PATENT DOCUMENTS

| | | | |
|---|---|---|---|
| 9,748,657 B1 | 8/2017 | Grimsrud et al. | |
| 10,916,842 B2 * | 2/2021 | Ai | H01Q 19/10 |
| 11,336,031 B2 * | 5/2022 | Wang | H01Q 19/108 |
| 2004/0021608 A1 | 2/2004 | Kojima et al. | |
| 2006/0017624 A1 | 1/2006 | Nagano et al. | |
| 2006/0061515 A1 * | 3/2006 | Posluszny | H01Q 9/285<br>343/803 |
| 2008/0150810 A1 | 6/2008 | Sugiyama et al. | |
| 2008/0158086 A1 | 7/2008 | Yamagajo et al. | |
| 2010/0103064 A1 * | 4/2010 | Yang | H01Q 1/243<br>343/793 |
| 2010/0220027 A1 | 9/2010 | Mori | |
| 2011/0208648 A1 | 8/2011 | Alothaimeen | |

FOREIGN PATENT DOCUMENTS

| | | |
|---|---|---|
| JP | 2007-202040 A | 8/2007 |
| JP | 2008-035219 A | 2/2008 |
| JP | 2008-113462 A | 5/2008 |
| JP | 2008-160314 A | 7/2008 |
| JP | 2010-200202 A | 9/2010 |
| JP | 2011-130002 A | 6/2011 |
| JP | 2012-500395 A | 1/2012 |

OTHER PUBLICATIONS

JP Office Action for JP Application No. 2020-057192, mailed on Sep. 7, 2021 with English Translation.

* cited by examiner

ANTENNA DEVICE

This application is a National Stage Entry of PCT/JP2021/011658 filed on Mar. 22, 2021, which claims priority from Japanese Patent Application 2020-057192 filed on Mar. 27, 2020, the contents of all of which are incorporated herein by reference, in their entirety.

TECHNICAL FIELD

The present invention relates to an antenna device.

BACKGROUND ART

In recent years, wireless products have been rapidly shifted from wireless products related to Human to wireless products related to Things. For example, there are now wireless vehicles, wireless vending machines, wireless trains, wireless factory monitoring systems, and the like. Regarding such products, the importance, in particular, of a GPS, which can provide location information, is increasing, and the number of radio waves the wireless products can catch from the sky is an important selling point of these products.

Further, in a mobile terminal such as a smartphone, the direction of the base station and the direction of the terminal constantly change and thus it is not known where radio waves arrive from. Thus, it is common to use a nondirectional antenna. On the other hand, there are systems such as a Global Positioning System (GPS) in which radio waves always arrive from the sky. Further, in the case of a terminal fixedly installed, it is desirable that the antenna have a directivity only in the direction of the sky.

In the above cases, in general, a patch antenna is often used. In many cases, the main body of a communication device has a thin structure, and when it is desired to reduce an area where the communication device is mounted, it may be placed vertically. Patent Literature 1 discloses an antenna comprising a linear radiating antenna element to which electric power is to be fed and a plurality of linear parasitic antenna elements to which electric power is not to be fed, wherein disposed at a position at which said radiating antenna element and said parasitic antenna elements cross each other without direct contact, said parasitic antenna elements lying in a direction in which said radiating antenna elements and said parasitic antenna elements cross each other, and wherein each of the crossing portions of said plural parasitic antenna elements, which portions cross said radiating antenna element, are bent in such a manner that the crossing portions of said parasitic antenna elements are in parallel with said radiating antenna element.

However, since a patch-type GPS antenna has a directivity in the direction of the sky by it being mounted so as to be flat, it has to be mounted so and thus the area where it is mounted becomes large. Further, since this antenna is configured separately from the main body of the communication device, there is a disadvantage that it is expensive.

Alternatively, a method for drawing the circuit of an antenna on a board of the product may be employed. However, the gain is small and the GPS satellite acquisition performance is poor.

CITATION LIST

Patent Literature

Patent Literature 1: Japanese Unexamined Patent Application Publication No. 2008-35219

SUMMARY OF INVENTION

Technical Problem

As described above, there is a problem that an antenna device which can be mounted in a small area and which can obtain a sufficient gain is expensive because it is configured so as to be separated from the main body of the communication device.

In view of the above-described problems, an object of the present disclosure is to provide an antenna device which can solve the above problems. Namely, it can be implemented at a low cost and an area where it is mounted can be minimized.

Solution to Problem

An antenna device according to an example embodiment includes: a mounting board including a circuit configured to process a radio signal; a dipole antenna element configured to receive the radio signal, the dipole antenna element being disposed in the mounting board; and a parasitic element including a first conductor wire parallel to the dipole antenna element, a second conductor wire connected to the first conductor wire at a first end of the first conductor wire at an angle larger than 0 degrees and smaller than 180 degrees, and a third conductor wire connected to the first conductor wire at a second end of the first conductor wire at an angle larger than 0 degrees and smaller than 180 degrees, in which at least an end of the second conductor wire is located near the dipole antenna element.

An antenna device according to an example embodiment includes: a mounting board including a circuit configured to process a radio signal; a dipole antenna element configured to receive the radio signal, the dipole antenna element being disposed in the mounting board; and a parasitic element including a first conductor wire parallel to the dipole antenna element, a second conductor wire connected to the first conductor wire at a first end of the first conductor wire at an angle larger than 0 degrees and smaller than 180 degrees, and a third conductor wire connected to the second conductor wire at an end of the second conductor wire at an angle larger than 0 degrees and smaller than 180 degrees, in which at least the end of the second conductor wire and the third conductor wire are located near the dipole antenna element.

Advantageous Effects of Invention

According to the present invention, it is possible to provide an antenna device which can solve the above problems. Namely, it can be implemented at a low cost and an area where it is mounted can be minimized.

EXAMPLE EMBODIMENT

Example embodiments of the present invention will be described hereinafter with reference to the drawings.

First Example Embodiment

Figure 1:
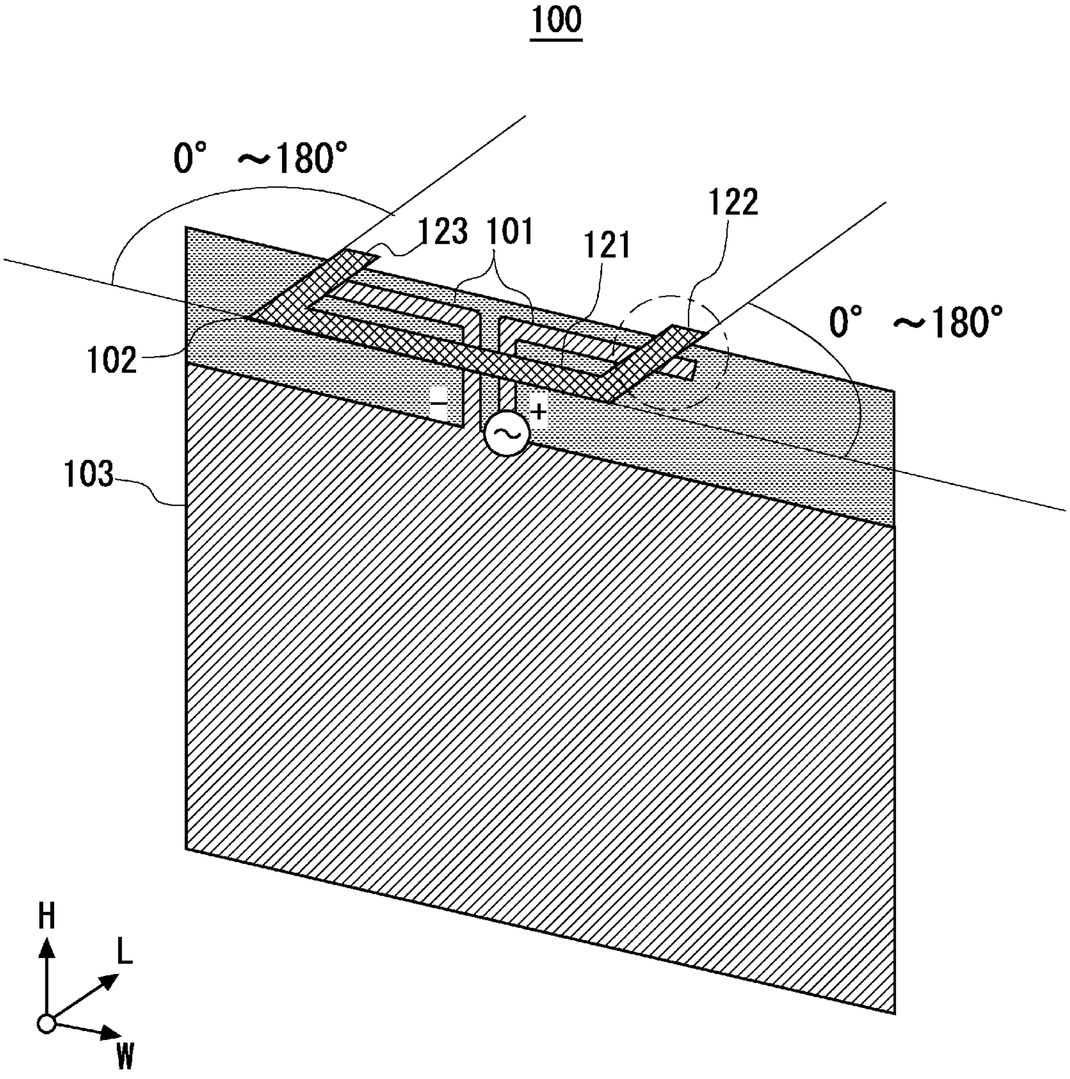
FIG. 1 is a perspective view showing a schematic configuration of an antenna device according to a first example embodiment.

FIG. 1 is a perspective view showing a schematic configuration of an antenna device according to a first example embodiment. In FIG. 1, an antenna device 100 includes a dipole antenna element 101, a parasitic antenna element 102, and a mounting board 103.

The dipole antenna element 101 is disposed in the mounting board 103 and receives a radio signal. The dipole antenna element 101 is an antenna element in which two linear conductor wires are symmetrically extended.

The parasitic antenna element 102 includes a first conductor wire 121 parallel to the dipole antenna element 101, a second conductor wire 122 connected to the first conductor wire 121 at a first end of the first conductor wire 121 at an angle larger than 0 degrees and smaller than 180 degrees, and a third conductor wire 123 connected to the first conductor wire 121 at a second end of the first conductor wire 121 at an angle larger than 0 degrees and smaller than 180 degrees. Further, at least an end of the second conductor wire 122 is located near the dipole antenna element 101.

The mounting board 103 includes a circuit that processes a radio signal received by the dipole antenna element 101.

As described above, the antenna device according to the first example embodiment can be implemented at a low cost, and an area where it is mounted can be minimized.

Second Example Embodiment

Figure 2:
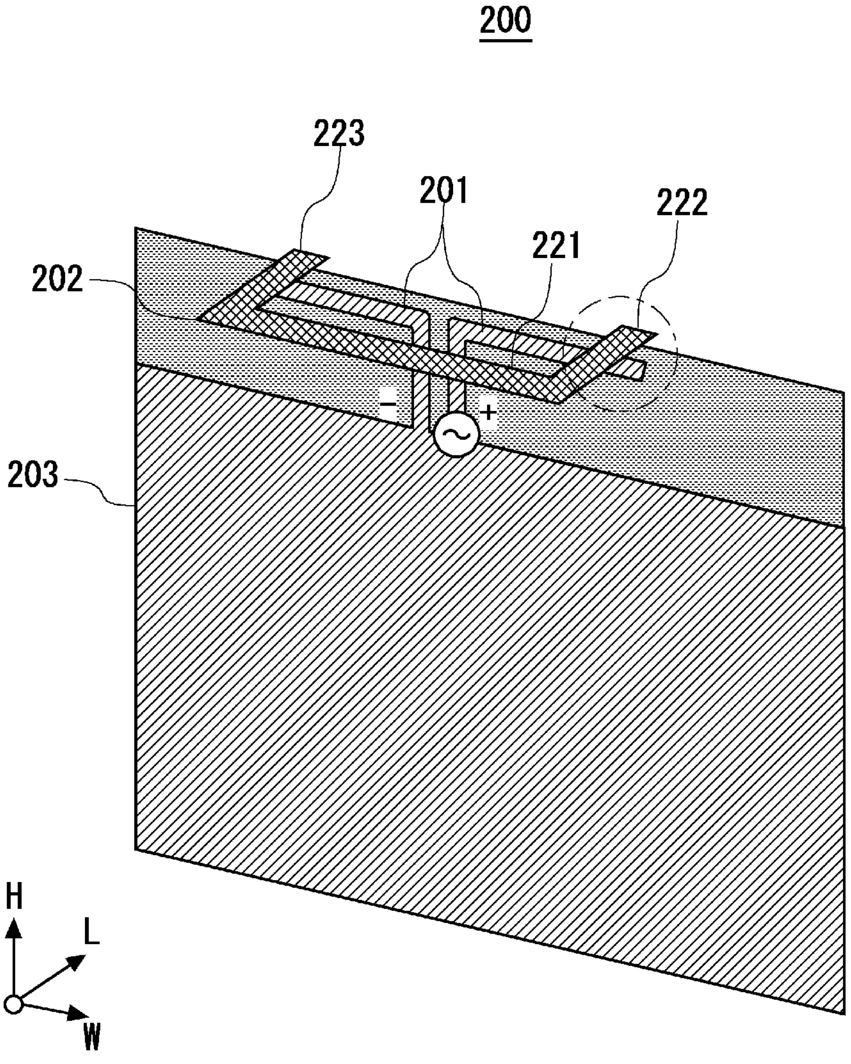
FIG. 2 is a perspective view showing a schematic configuration of an antenna device according to a second example embodiment.

FIG. 2 is a perspective view showing a schematic configuration of an antenna device according to a second example embodiment. In FIG. 2, an antenna device 200 includes a dipole antenna element 201, a parasitic antenna element 202, and a mounting board 203.

The dipole antenna element 201 is an antenna element in which two linear conductor wires are symmetrically extended from a feeding point. The two linear conductor wires of the dipole antenna element 201 are arranged at a position that is spaced apart from the mounting board 203. The two linear conductor wires of the dipole antenna element 201 are connected to a circuit of the mounting board 203 through the feeding point. The dipole antenna element 201 is disposed in the mounting board 203 and receives a radio signal. The radio signal is, for example, a positioning signal.

The parasitic antenna element 202 includes three conductor wires of a first conductor wire 221, a second conductor wire 222, and a third conductor wire 223. The first conductor wire 221 and the second conductor wire 222 are connected to each other at a first end of the first conductor wire 221 at an angle larger than 0 degrees and smaller than 180 degrees in the LW plane. An angle formed by the first conductor wire 221 and the second conductor wire 222 in the LW plane is preferably 90 degrees.

Further, the first conductor wire 221 and the third conductor wire 223 are connected to each other at a second end of the first conductor wire 221 at an angle larger than 0 degrees and smaller than 180 degrees in the LW plane. An angle formed by the first conductor wire 221 and the third conductor wire 223 in the LW plane is preferably 90 degrees.

Further, the parasitic antenna element 202 is a parasitic antenna element that is not connected to the circuit of the mounting board 203. Further, in the parasitic antenna element 202, the first conductor wire 221 is disposed parallel to one side of the mounting board 203 at a position that is spaced apart from the mounting board 203.

Among the three linear conductor wires, one end of each of the second conductor wire 222 and the third conductor wire 223 is connected to an end of the first conductor wire 221 and the other end of each of the second conductor wire 222 and the third conductor wire 223 is disposed near the dipole antenna element 201. A distance between each of the respective ends of the second conductor wire 222 and the third conductor wire 223 and the dipole antenna element 201 is preferably within one twentieth of the wavelength of a target frequency. The above statement that the respective ends of the second conductor wire 222 and the third conductor wire 223 are disposed near the dipole antenna element 201 means, in other words, that the second conductor wire 222 and the third conductor wire 223 are located so that the respective ends thereof are spatially coupled to the dipole antenna element 201. In order to perform the aforementioned spatial coupling, it is necessary to bring the second and third conductor wires 222 and 223 close to an end point of the antenna, that is, a part of the antenna where a flowing high-frequency current is small and a voltage is large. Further, in the dipole antenna, the power feeding side (the conductor wire 222 in the case of the device 200) needs to satisfy the above condition.

Further, the direction in which the third conductor wire 223 is extended is parallel to the direction in which the second conductor wire 222 is extended.

Further, the entire length of the parasitic antenna element 202 is preferably one-half of the wavelength of a radio signal to be received, which is a so-called half-wavelength.

The mounting board 203 is a board which is connected to the dipole antenna element 201 and which includes a circuit that processes a radio signal received by the dipole antenna element 201. For example, the mounting board 203 may be a printed circuit board including a circuit that measures the position of the antenna device 200 from a positioning signal (e.g., Global Navigation Satellite System (GNSS) signal). Since the mounting board 203 is not connected to the parasitic antenna element 202, the parasitic antenna element 202 acts as a parasitic antenna element. For example, the mounting board 203 may include a square metal layer formed for GND on one surface thereof. This metal layer for GND is a layer with a reference potential. Further, the metal layer for GND may be formed in one of layers of a laminated board.

Since the antenna device 200 includes a non-contact parasitic element shown in FIG. 2, it differs from an antenna device including only a dipole antenna. As shown in FIG. 2, the dipole antenna element 201 and the parasitic antenna element 202 are spatially coupled to each other at the respective front ends thereof.

Figure 3:
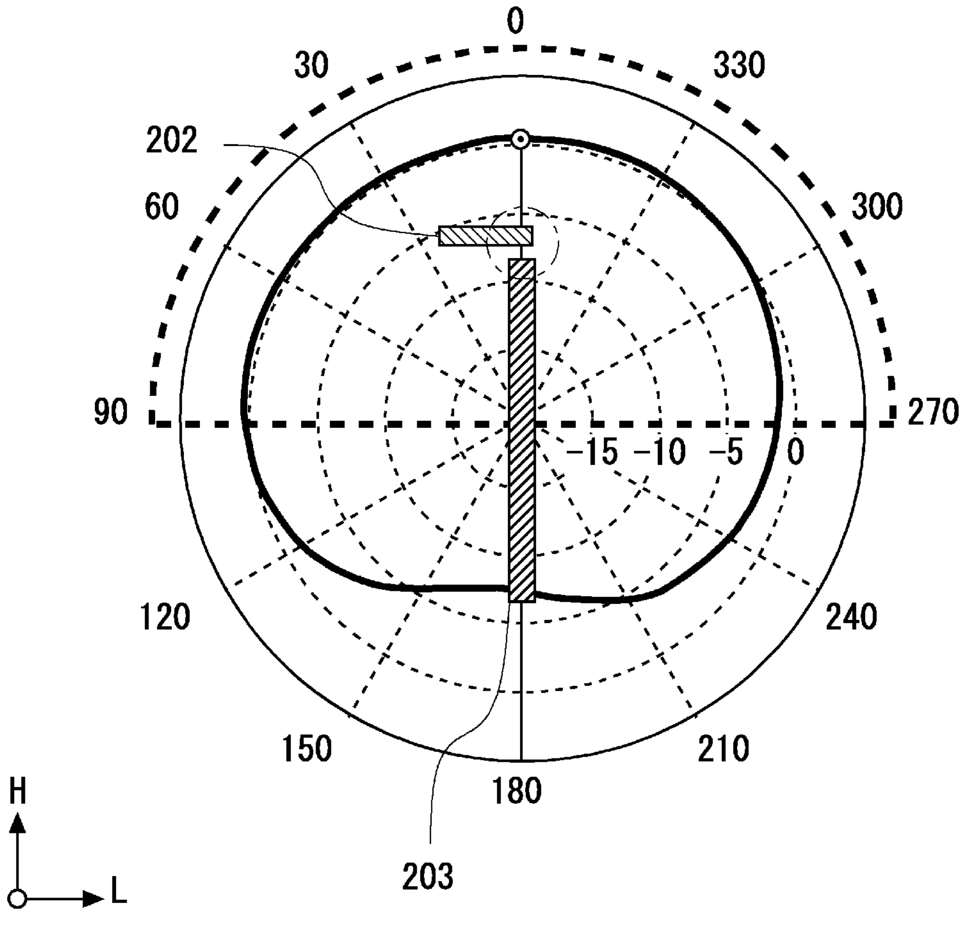
FIG. 3 is a diagram showing directivity of the antenna device according to the second example embodiment.

FIG. 3 is a diagram showing directivity of the antenna device according to the second example embodiment. FIG. 3 shows the directivity of the antenna device 200 in a vertical plane (the HL plane in FIG. 2).

Figure 4:
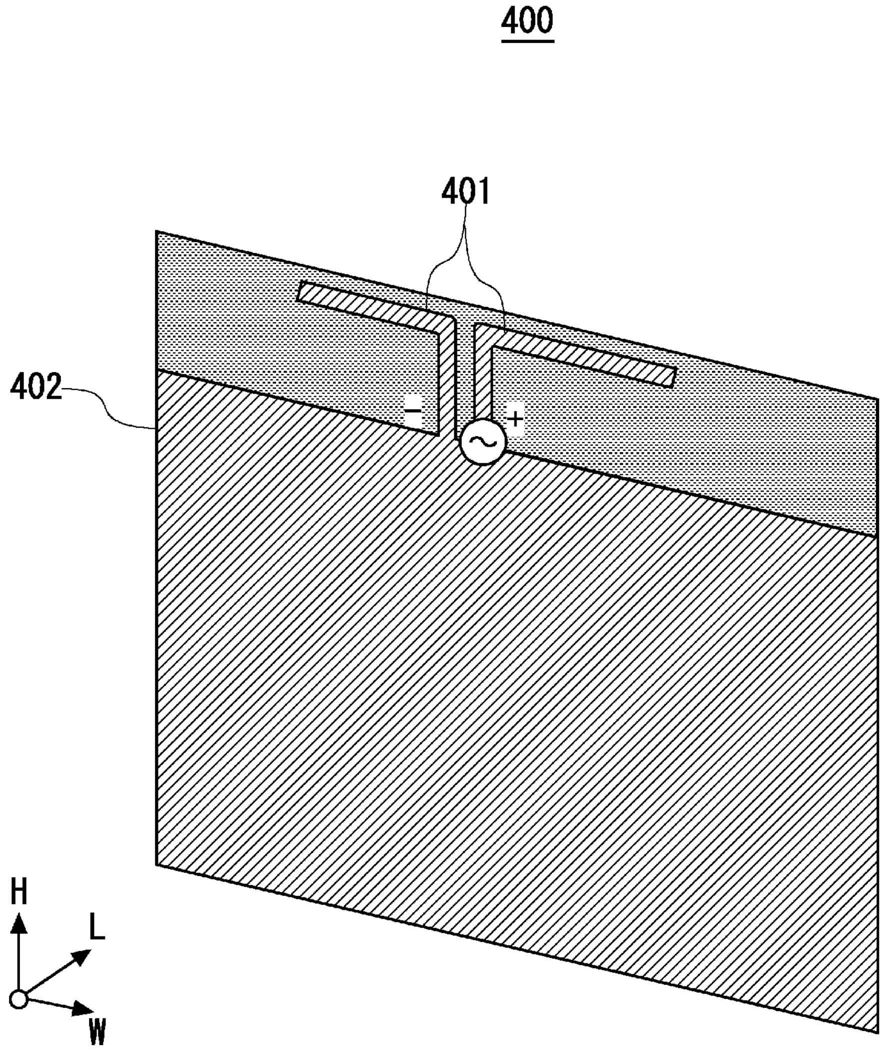
FIG. 4 is a diagram showing an example of a dipole antenna installed in a mounting board.

A dipole antenna which will be compared with the antenna device is as follows. FIG. 4 is a diagram showing an example of the dipole antenna installed in the mounting board. In FIG. 4, a dipole antenna device 400 includes a dipole antenna element 401 and a mounting board 402.

Figure 5:
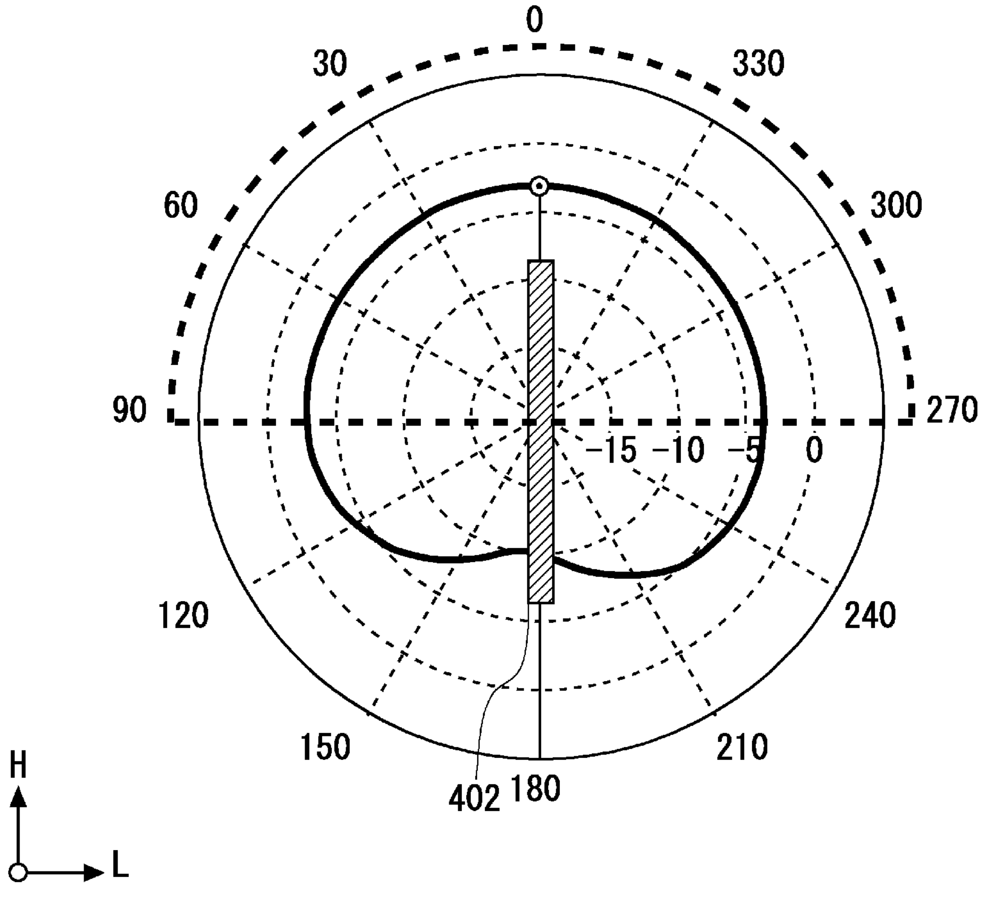
FIG. 5 is a diagram showing directivity of the dipole antenna.

FIG. 5 is a diagram showing directivity of the dipole antenna. FIG. 5 shows the directivity of the dipole antenna, which is to be compared with the antenna device 200, in a vertical plane (the HL plane in FIG. 4).

A comparison between FIGS. 3 and 5 shows that the reception range of the antenna device 200 is larger than that of the dipole antenna. Therefore, the antenna radiation performance of the antenna device 200 is better than that of the dipole antenna show in FIG. 4. This is because a high-frequency current, which is the source of radio waves, is made to flow through the non-contact parasitic element by spatial coupling, and thus the radiation efficiency of the radio waves is improved. According to the present invention, the gain in the direction of the sky can be increased while the thickness of a product is maintained, and any non-contact parasitic antenna element having metallic properties can be used and thus its cost can be reduced.

As described above, the antenna device according to the second example embodiment can be implemented at a low cost and an area where it is mounted can be minimized.

When the parasitic antenna element 202 is mounted, for example, it can be stuck on the backside of a housing, insert-molded into the housing, or stuck on the outside of the housing.

Third Example Embodiment

Figure 6:
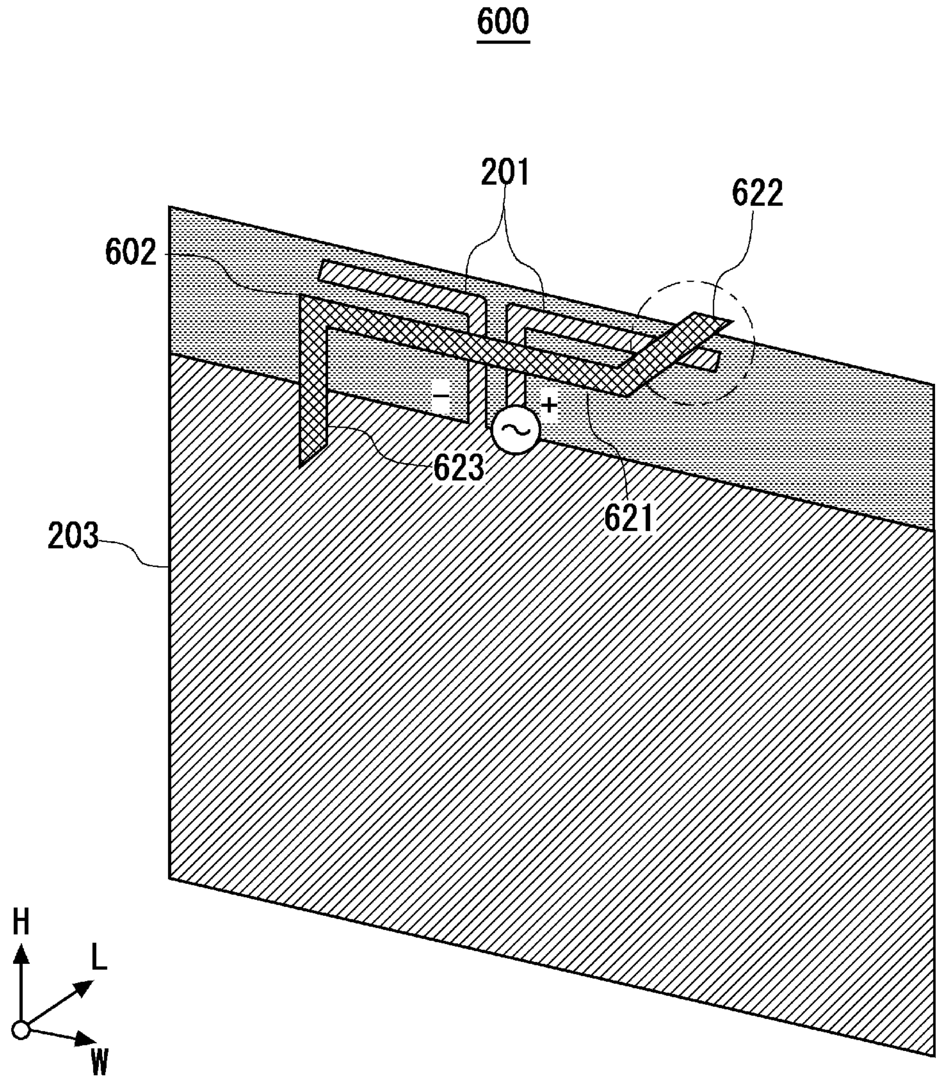
FIG. 6 is a perspective view showing a schematic configuration of an antenna device according to a third example embodiment.

FIG. 6 is a perspective view showing a schematic configuration of an antenna device according to a third example embodiment. In FIG. 6, an antenna device 600 includes the dipole antenna element 201, a parasitic antenna element 602, and the mounting board 203. In FIG. 6, the same components as those in FIG. 2 are denoted by the same reference numerals, and descriptions thereof will be omitted.

The parasitic antenna element 602 includes three conductor wires of a first conductor wire 621, a second conductor wire 622, and a third conductor wire 623.

The direction in which the third conductor wire 623 is extended is perpendicular to the direction in which the second conductor wire 622 is extended. The direction in which the second conductor wire 622 is extended is perpendicular to the mounting board 203. The direction in which the third conductor wire 623 is extended is parallel to the mounting board 203.

The first conductor wire 621 and the second conductor wire 622 are connected to each other at a first end of the first conductor wire 621 at an angle larger than 0 degrees and smaller than 180 degrees in the LW plane. An angle formed by the first conductor wire 621 and the second conductor wire 622 in the LW plane is preferably 90 degrees.

One end of the second conductor wire 622 is connected to an end of the first conductor wire 621, and the other end of the second conductor wire 622 is disposed near the dipole antenna element 201. That is, the second conductor wire 622 is located so that both ends thereof are spatially coupled to the dipole antenna element 201.

Further, the first conductor wire 621 and the third conductor wire 623 are connected to each other at a second end of the first conductor wire 621 at an angle larger than 0 degrees and smaller than 180 degrees in the HW plane. An angle formed by the first conductor wire 621 and the third conductor wire 623 in the HW plane is preferably 90 degrees.

When the parasitic antenna element 602 is mounted, for example, it can be stuck on the backside of a housing, insert-molded into the housing, or stuck on the outside of the housing.

Fourth Example Embodiment

Figure 7:
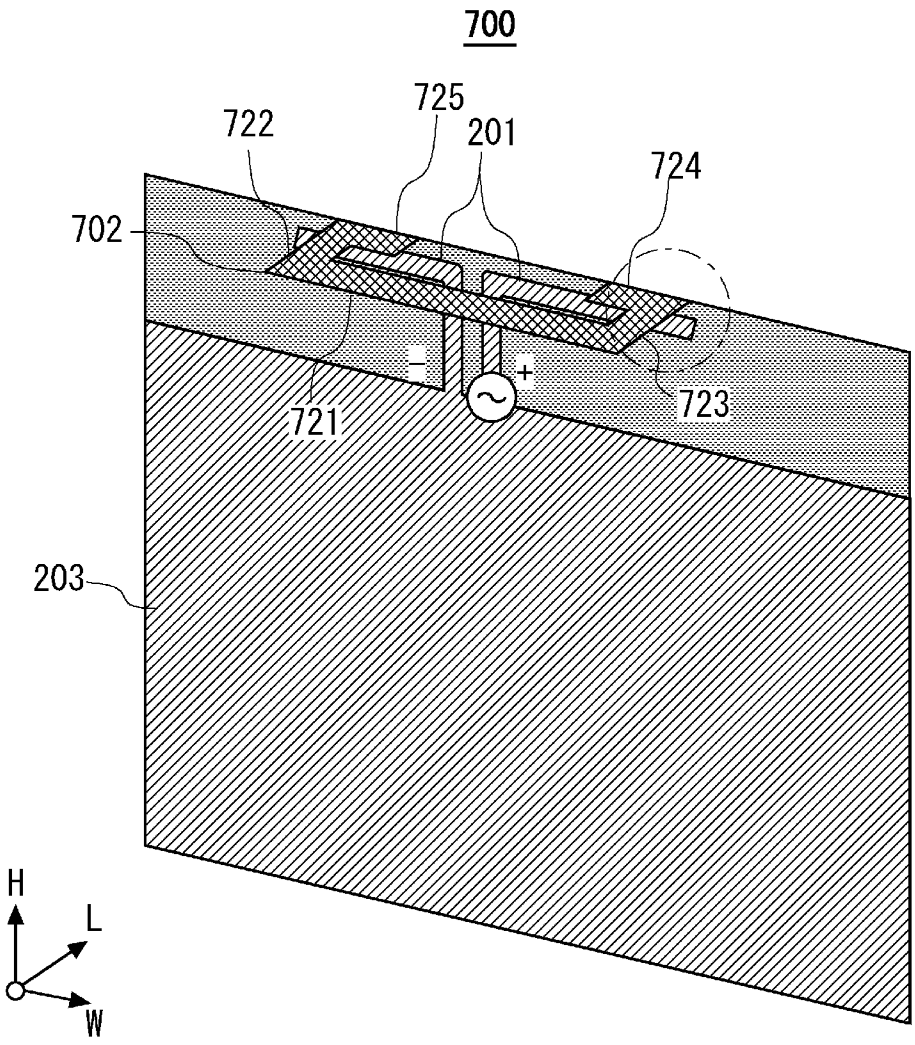
FIG. 7 is a perspective view showing a schematic configuration of an antenna device according to a fourth example embodiment.

FIG. 7 is a perspective view showing a schematic configuration of an antenna device according to a fourth example embodiment. In FIG. 7, an antenna device 700 includes the dipole antenna element 201, a parasitic antenna element 702, and the mounting board 203. In FIG. 7, the same components as those in FIG. 2 are denoted by the same reference numerals, and descriptions thereof will be omitted.

The parasitic antenna element 702 includes five conductor wires of a first conductor wire 721, a second conductor wire 722, a third conductor wire 723, a fourth conductor wire 724, and a fifth conductor wire 725.

As shown in FIG. 7, one end of each of the second conductor wire 722 and the third conductor wire 723 is connected to an end of the first conductor wire 721 and the other end of each of the second conductor wire 722 and the third conductor wire 723 is disposed near the dipole antenna element 201. That is, the second conductor wire 722 and the third conductor wire 723 are located so that the respective ends thereof are spatially coupled to the dipole antenna element 201. Further, at least a part of the fourth conductor wire 724 and a part of the fifth conductor wire 725 are disposed near the dipole antenna element 201. The entire fourth conductor wire 724 and fifth conductor wire 725 are preferably disposed near the dipole antenna element 201. That is, the entire fourth conductor wire 724 and fifth conductor wire 725 are located so as to be spatially coupled to the dipole antenna element 201.

The first conductor wire 721 and the second conductor wire 722 are connected to each other at a first end of the first conductor wire 721 at an angle larger than 0 degrees and smaller than 180 degrees in the LW plane. An angle formed by the first conductor wire 721 and the second conductor wire 722 in the LW plane is preferably 90 degrees.

The second conductor wire 722 and the fourth conductor wire 724 are connected to each other at a first end of the second conductor wire 722 at an angle larger than 0 degrees and smaller than 180 degrees in the LW plane. An angle formed by the second conductor wire 722 and the fourth conductor wire 724 in the LW plane is preferably 90 degrees. Further, the first conductor wire 721 and the fourth conductor wire 724 are preferably parallel to each other in the LW plane.

Further, the first conductor wire 721 and the third conductor wire 723 are connected to each other at a second end of the first conductor wire 721 at an angle larger than 0 degrees and smaller than 180 degrees in the HW plane. An angle formed by the first conductor wire 721 and the third conductor wire 723 in the HW plane is preferably 90 degrees.

The third conductor wire 723 and the fifth conductor wire 725 are connected to each other at a first end of the third conductor wire 723 at an angle larger than 0 degrees and smaller than 180 degrees in the LW plane. An angle formed by the third conductor wire 723 and the fifth conductor wire 725 in the LW plane is preferably 90 degrees. Further, the first conductor wire 721 and the fifth conductor wire 725 are preferably parallel to each other in the LW plane.

When the parasitic antenna element 702 is mounted, for example, it can be stuck on the backside of a housing, insert-molded into the housing, or stuck on the outside of the housing.

Fifth Example Embodiment

Figure 8:
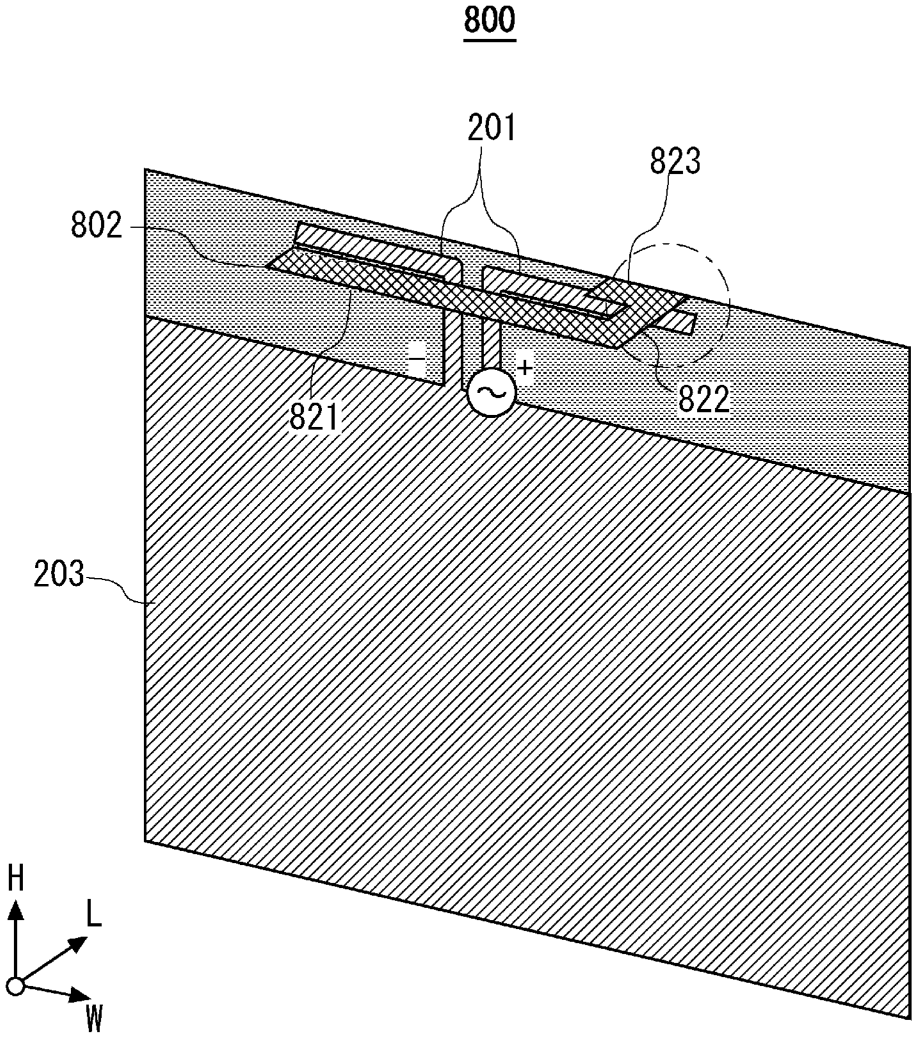
FIG. 8 is a perspective view showing a schematic configuration of an antenna device according to a fifth example embodiment.

FIG. 8 is a perspective view showing a schematic configuration of an antenna device according to a fifth example embodiment. In FIG. 8, an antenna device 800 includes the dipole antenna element 201, a parasitic antenna element 802, and the mounting board 203. In FIG. 8, the same components as those in FIG. 2 are denoted by the same reference numerals, and descriptions thereof will be omitted.

The parasitic antenna element 802 includes three conductor wires of a first conductor wire 821, a second conductor wire 822, and a third conductor wire 823.

As shown in FIG. 8, one end of the second conductor wire 822 is connected to an end of the first conductor wire 821, and the other end of the second conductor wire 822 is disposed near the dipole antenna element 201. That is, the second conductor wire 822 is located so that both ends thereof are spatially coupled to the dipole antenna element 201. Further, at least a part of the third conductor wire 823 is disposed near the dipole antenna element 201. The entire third conductor wire 823 is preferably disposed near the dipole antenna element 201. That is, the entire third conductor wire 823 is located so as to be spatially coupled to the dipole antenna element 201.

The first conductor wire 821 and the second conductor wire 822 are connected to each other at a first end of the first conductor wire 821 at an angle larger than 0 degrees and smaller than 180 degrees in the LW plane. An angle formed by the first conductor wire 821 and the second conductor wire 822 in the LW plane is preferably 90 degrees.

The second conductor wire 822 and the third conductor wire 823 are connected to each other at a first end of the second conductor wire 822 at an angle larger than 0 degrees and smaller than 180 degrees in the LW plane. An angle formed by the second conductor wire 822 and the third conductor wire 823 in the LW plane is preferably 90 degrees. Further, the first conductor wire 821 and the third conductor wire 823 are preferably parallel to each other in the LW plane.

When the parasitic antenna element 802 is mounted, for example, it can be stuck on the backside of a housing, insert-molded into the housing, or stuck on the outside of the housing.

Sixth Example Embodiment

Figure 9:
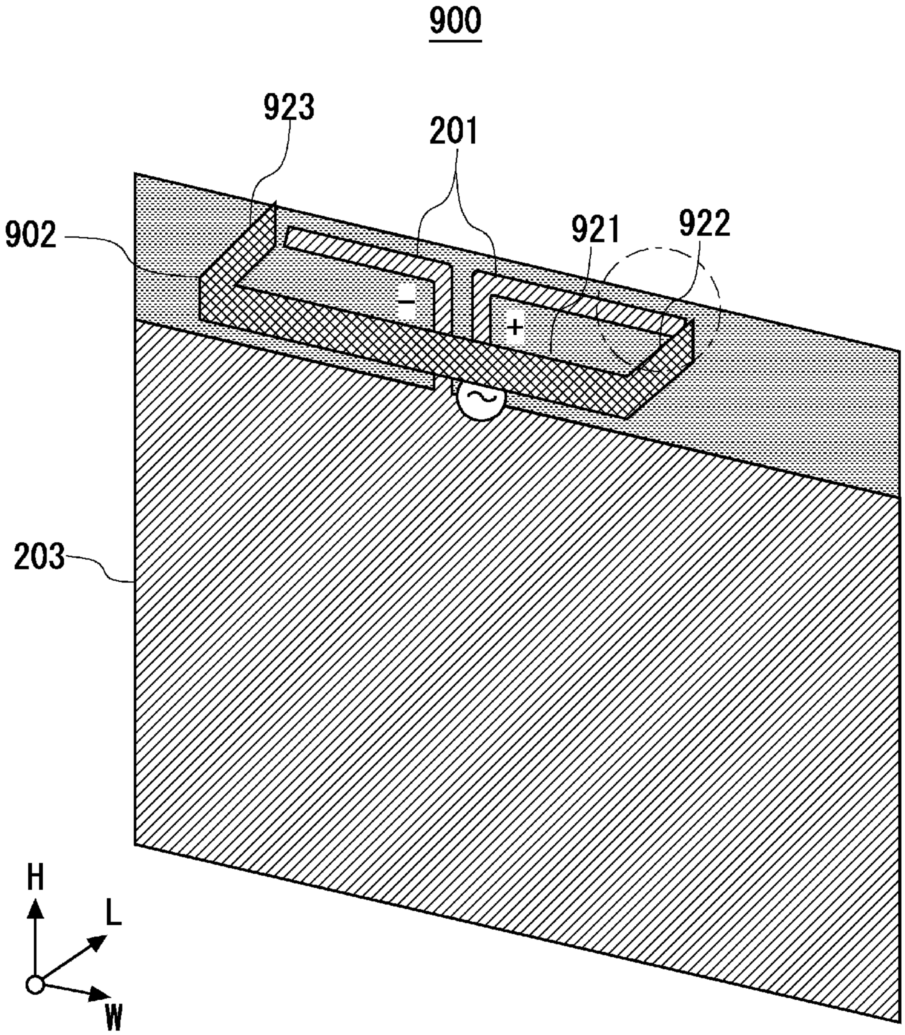
FIG. 9 is a perspective view showing a schematic configuration of an antenna device according to a sixth example embodiment.

FIG. 9 is a perspective view showing a schematic configuration of an antenna device according to a sixth example embodiment. In FIG. 9, an antenna device 900 includes the dipole antenna element 201, a parasitic antenna element 902, and the mounting board 203. In FIG. 9, the same components as those in FIG. 2 are denoted by the same reference numerals, and descriptions thereof will be omitted.

The parasitic antenna element 902 includes three conductor wires of a first conductor wire 921, a second conductor wire 922, and a third conductor wire 923. Each of the first conductor wire 921, the second conductor wire 922, and the third conductor wire 923 has a planar shape and is made of metal. One end of each of the second conductor wire 922 and the third conductor wire 923 is connected to an end of the first conductor wire 921 and the other end of each of the second conductor wire 922 and the third conductor wire 923 is disposed near the dipole antenna element 201. That is, the second conductor wire 922 and the third conductor wire 923 are located so that the respective ends thereof are spatially coupled to the dipole antenna element 201.

The main surface of the first conductor wire 921 is parallel to the mounting board 203. Further, the main surface of each of the second conductor wire 922 and the third conductor wire 923 is parallel to the H axis. The main surface of each of the second conductor wire 922 and the third conductor wire 923 is preferably perpendicular to the mounting board 203.

The first conductor wire 921 and the second conductor wire 922 are connected to each other at a first end of the first conductor wire 921 at an angle larger than 0 degrees and smaller than 180 degrees in the LW plane. An angle formed by the first conductor wire 921 and the second conductor wire 922 in the LW plane is preferably 90 degrees.

Further, the first conductor wire 921 and the third conductor wire 923 are connected to each other at a second end of the first conductor wire 921 at an angle larger than 0 degrees and smaller than 180 degrees in the LW plane. An angle formed by the first conductor wire 921 and the third conductor 923 in the LW plane is preferably 90 degrees.

Further, the parasitic antenna element 902 is a parasitic antenna element that is not connected to the circuit of the mounting board 203. Further, in the parasitic antenna element 902, the first conductor wire 921 is disposed parallel to one side of the mounting board 203 at a position that is spaced apart from the mounting board 203.

Among the three linear conductor wires, one end of each of the second conductor wire 922 and the third conductor wire 923 is connected to the end of the first conductor wire 921 and the other end of each of the second conductor wire 922 and the third conductor wire 923 is disposed near the dipole antenna element 201. That is, the second conductor wire 922 and the third conductor wire 923 are located so that the respective ends thereof are spatially coupled to the dipole antenna element 201. Further, the direction in which the third conductor wire 923 is extended is parallel to the direction in which the second conductor wire 922 is extended.

The parasitic antenna element 902 can be inserted into the mounting board 203 and fixed.

Seventh Example Embodiment

Figure 10:
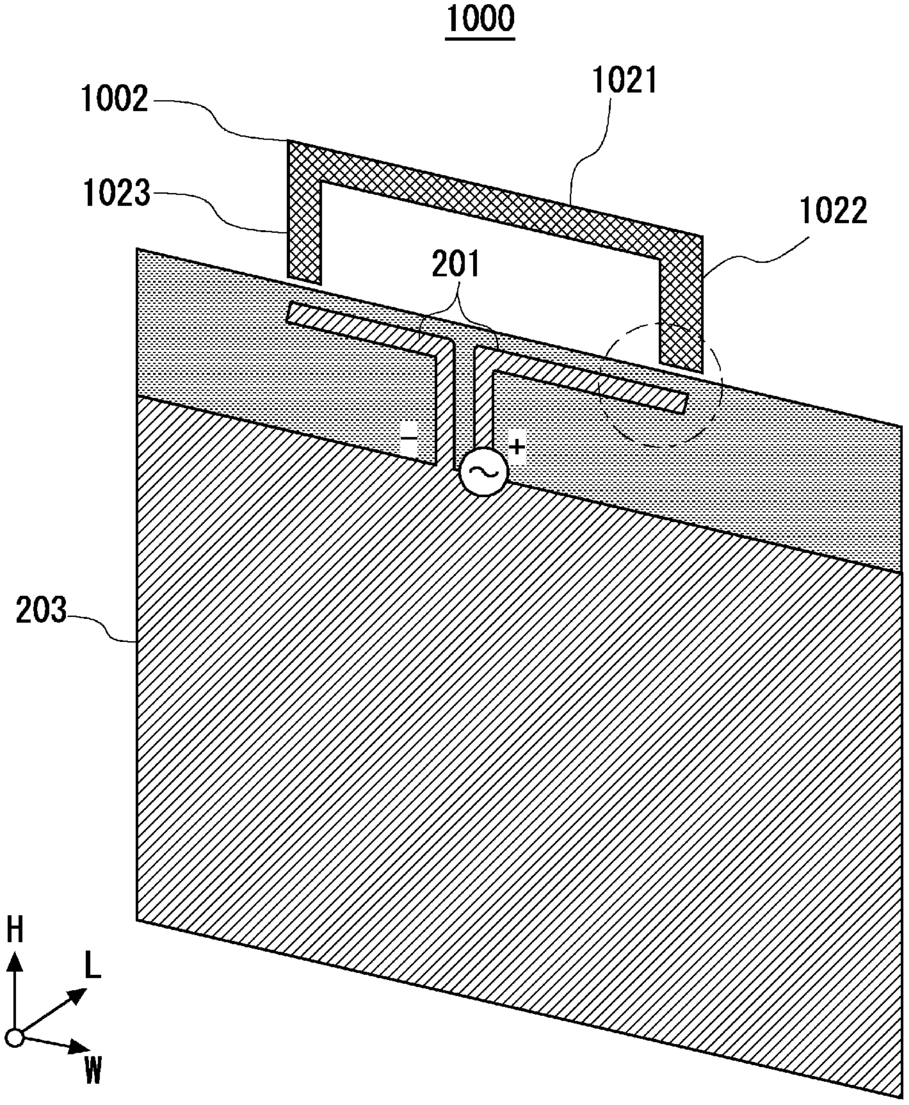
FIG. 10 is a perspective view showing a schematic configuration of an antenna device according to a seventh example embodiment.

FIG. 10 is a perspective view showing a schematic configuration of an antenna device according to a seventh example embodiment. In FIG. 10, an antenna device 1000 includes the dipole antenna element 201, a parasitic antenna element 1002, and the mounting board 203. In FIG. 10, the same components as those in FIG. 2 are denoted by the same reference numerals, and descriptions thereof will be omitted.

The parasitic antenna element 1002 includes three conductor wires of a first conductor wire 1021, a second conductor wire 1022, and a third conductor wire 1023. Each of the first conductor wire 1021, the second conductor wire 1022, and the third conductor wire 1023 has a planar shape and is made of metal. One end of each of the second conductor wire 1022 and the third conductor wire 1023 is connected to an end of the first conductor wire 1021 and the other end of each of the second conductor wire 1022 and the third conductor wire 1023 is disposed near the dipole antenna element 201. That is, the second conductor wire 1022 and the third conductor wire 1023 are located so that the respective ends thereof are spatially coupled to the dipole antenna element 201.

The main surface of the first conductor wire 1021, that of the second conductor wire 1022, and that of the third conductor wire 1023 are each disposed parallel to and in the same plane as the mounting board 203.

The first conductor wire 1021 and the second conductor wire 1022 are connected to each other at a first end of the first conductor wire 1021 at an angle larger than 0 degrees and smaller than 180 degrees in the HW plane. An angle formed by the first conductor wire 1021 and the second conductor wire 1022 in the HW plane is preferably 90 degrees.

Further, the first conductor wire 1021 and the third conductor wire 1023 are connected to each other at a second end of the first conductor wire 1021 at an angle larger than 0 degrees and smaller than 180 degrees in the HW plane. An angle formed by the first conductor wire 1021 and the third conductor 1023 in the HW plane is preferably 90 degrees.

Further, the parasitic antenna element 1002 is a parasitic antenna element that is not connected to the circuit of the mounting board 203. Further, in the parasitic antenna element 1002, the first conductor wire 1021 is disposed parallel to one side of the mounting board 203 and in the same plane as the mounting board 203 at a position that is spaced apart from the mounting board 203.

Among the three linear conductor wires, one end of each of the second conductor wire 1022 and the third conductor wire 1023 is connected to the end of the first conductor wire 1021 and the other end of each of the second conductor wire 1022 and the third conductor wire 1023 is disposed near the dipole antenna element 201. That is, the second conductor wire 1022 and the third conductor wire 1023 are located so that the respective ends thereof are spatially coupled to the dipole antenna element 201. Further, the direction in which the third conductor wire 1023 is extended is parallel to the direction in which the second conductor wire 1022 is extended. The antenna device 1000 is advantageous when there is a margin in the height direction. Note that, by making the shape of the parasitic antenna element 1002 similar to that of the parasitic antenna element 702 shown in FIG. 7, it is possible to further reduce the size of the parasitic antenna element 1002. Further, the circuit of the parasitic antenna element may be directly drawn on the component mounting board of the product instead of being formed of different metal.

As described above, by using the non-contact parasitic antenna element according to the present invention, it is possible to minimize an area where a radio device is mounted and to obtain an ideal gain in the direction of the sky at a low cost.

Note that the present invention is not limited to the above-described example embodiments and may be changed as appropriate without departing from the spirit of the present invention. For example, although a dipole antenna is used in the antenna device according to the above-described example embodiments, an inverted L antenna or inverted F antenna can instead be used. By removing the (-) element of the dipole, the antenna becomes structurally an inverted L antenna.

Further, the antenna device according to the above-described example embodiments is intended to minimize the occupancy areas of the antenna and the parasitic antenna. For example, there are few products equipped with only a GPS radio system. Products are also equipped with other communication systems such as LTE, Wi-Fi, and LPWA. These are to enable information obtained by the GPS to be transmitted to others via cloud. In this case, it is important to design the antenna device so that it avoids interference with antennas of other systems, and maintaining a sufficient distance between the antennas is the most basic means for avoiding such interference. Therefore, it is desirable that a GPS antenna be completed within its own area, and the antenna device according to the above-described example embodiments aims to reduce the size thereof and achieve a high performance.

Although the present invention has been described with reference to the example embodiments, the present invention is not limited to the above-described example embodiments. Various changes that may be understood by those skilled in the art may be made to the configurations and details of the present invention within the scope of the invention.

This application is based upon and claims the benefit of priority from Japanese patent application No. 2020-057192, filed on Mar. 27, 2020, the disclosure of which is incorporated herein in its entirety by reference.

REFERENCE SIGNS LIST

100, 200, 600, 700, 800, 900, 1000 ANTENNA DEVICE
101, 201 DIPOLE ANTENNA ELEMENT
102, 202, 602, 702, 802, 902, 1002 PARASITIC ANTENNA ELEMENT
103, 203 MOUNTING BOARD
121, 221, 621, 721, 821, 921, 1021 FIRST CONDUCTOR WIRE
122, 222, 622, 722, 822, 922, 1022 SECOND CONDUCTOR WIRE
123, 223, 623, 723, 823, 923, 1023 THIRD CONDUCTOR WIRE
724 FOURTH CONDUCTOR WIRE
725 FIFTH CONDUCTOR WIRE
400 DIPOLE ANTENNA DEVICE
401 DIPOLE ANTENNA ELEMENT
402 MOUNTING BOARD

The invention claimed is:

1. An antenna device comprising:

a mounting board comprising a circuit configured to process a radio signal;

a dipole antenna element configured to receive the radio signal, the dipole antenna element being disposed in the mounting board; and a parasitic element comprising a first conductor wire parallel to the dipole antenna element, a second conductor wire connected to the first conductor wire at a first end of the first conductor wire at an angle larger than 0 degrees and smaller than 180 degrees, and a third conductor wire connected to the first conductor wire at a second end of the first conductor wire at an angle larger than 0 degrees and smaller than 180 degrees, wherein at least an end of the second conductor wire is located closer to the dipole antenna element than the first conductor wire is, and the end of the second conductor wire and an end of the dipole antenna element are formed so as to face each other, wherein a direction in which the third conductor wire is extended is perpendicular to a direction in which the second conductor wire is extended.

2. The antenna device according to claim 1, wherein at least the end of the second conductor wire is located so as to be spatially coupled with the dipole antenna element.

3. The antenna device according to claim 1, wherein the radio signal includes at least a positioning signal, the mounting board comprises a circuit configured to determine a position based on the positioning signal, and the dipole antenna element receives the positioning signal.

* * * * *